United States Patent [19]

Harrington

[11] Patent Number: 4,715,124
[45] Date of Patent: Dec. 29, 1987

[54] PROFILE GAUGE

[75] Inventor: Patrick W. Harrington, Hertfordshire, England

[73] Assignee: Florin Limited, London, England

[21] Appl. No.: 852,982

[22] Filed: Apr. 16, 1986

[30] Foreign Application Priority Data

Apr. 26, 1985 [GB] United Kingdom ............. 8510730

[51] Int. Cl.⁴ .................................................. G01B 5/20
[52] U.S. Cl. ......................................................... 33/175
[58] Field of Search ............... 33/175, 176, 177, 158, 33/161, 464, 143 M, 168 R; 7/167, 168

[56] References Cited

U.S. PATENT DOCUMENTS

| | | | |
|---|---|---|---|
| 241,241 | 5/1881 | Ruge | 33/175 |
| 362,724 | 5/1887 | Davenport | 33/175 |
| 1,888,069 | 11/1932 | Buck | 33/168 R |
| 2,759,271 | 8/1956 | Duyke | 33/175 |
| 3,925,898 | 12/1975 | Melnik | 33/158 X |
| 3,983,632 | 10/1976 | Halstead | 33/175 |

FOREIGN PATENT DOCUMENTS 574729  1/1946  United Kingdom .
762779 12/1956  United Kingdom .

Primary Examiner—Harry N. Haroian
Attorney, Agent, or Firm—William R. Hinds

[57] ABSTRACT

An improved profile gauge comprises a multitude of longitudinally slotted elongate members (1) which are independently biased into frictional contact with, and longitudinally slidable with respect to, a common supporting member (2) engaged through all the slots (6) of the elongate members.

8 Claims, 7 Drawing Figures

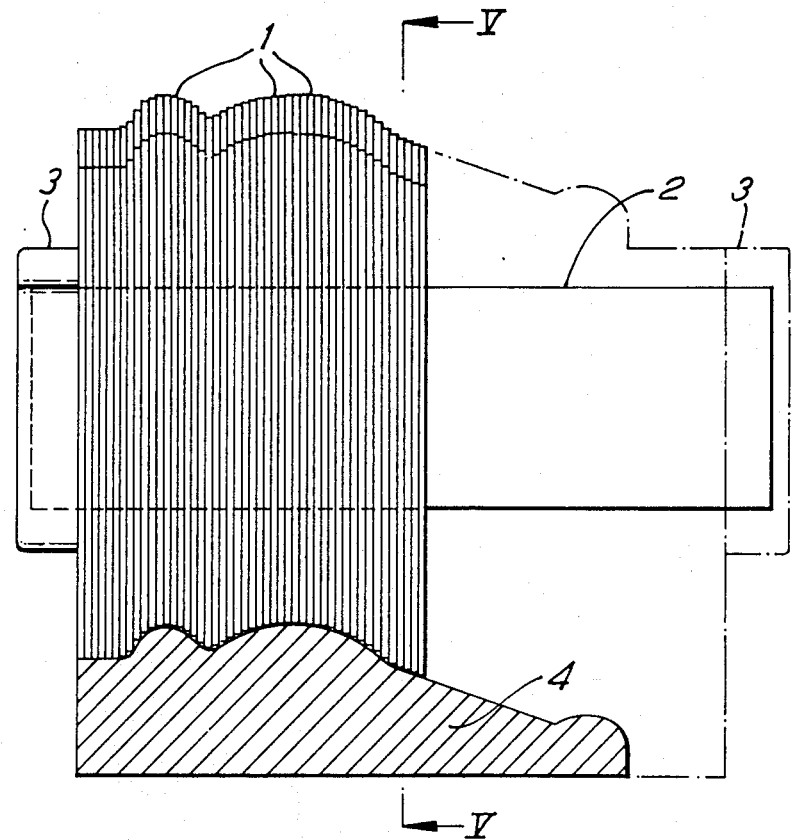
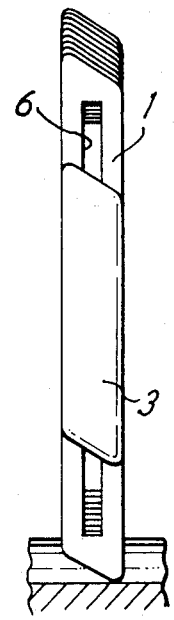
FIG.3
FIG.4

PROFILE GAUGE

The invention relates to a profile transferring device commonly known as a profile gauge for enabling the contour of a profile to be reproduced.

Various forms of such profile gauges are known, the most successful one in use being much the same as that described in GB-PS No. 931 463 and shown in FIGS. 1 and 2 of the accompanying drawings, which are respectively a top perspective view and cross-section of the known gauge. It consists of a multitude of equally long straight stainless steel rods A projecting from a sheet metal housing B with both ends clamped side by side in one plane between a friction member C and at least one bearing surface D in the housing so that the can be forced to slide lengthwise at right angles to the housing B. In the as-sold construction, the housing B consists of two sheet metal stampings E and F held together by end caps G. When the gauge is applied to a profile with the tips of the rods at one end pushed into contact with the profile, the rods will slide against the friction exerted by the parts C and D so that the tips together assume the counterpart of the contour of the profile whilst the opposite ends of the rods will define a replica of the contour. The gauge can then be taken away to wherever the contour of the profile is to be reproduced, for example to a floor tile or carpet which is to be cut out to fit a complex architrave shape.

Although the known profile gauge is most useful, it exhibits certain disadvantages which complicate its production and use. First, the rods A have to be of metal to avoid bending, but metal is apt to scratch or otherwise damage a profile to which the gauge is applied with a push force. Second, it will be evident that the friction exerted on the rods A by the parts C and D and by the sheet metal stamps E and F where the rods leave the housing should be light to minimise the resistance on the rods A to longitudinal sliding. Otherwise, impossibly high forces would be necessary to push the tips of the steel rods into contact with a profile and damage of the profile is even more likely to occur. On the other hand, the friction on the rods is desired to be high so as to avoid accidental displacement of the rods after the gauge has been withdrawn from the profile, especially whilst the contour is being transferred from the gauge to a workpiece. A happy compromise to make the frictional forces suit both functions is most difficult to achieve in practice.

Next, it is desirable that all the rods A be clamped in the housing with substantially the same pressure but, again, this is practically impossible to achieve with the known construction. Before the housing B is assembled, the sheet metal samplings E and F are longitudinally bowed so that a force has to be exerted on the ends of the stampings to bring them together and to secure them with the end caps G. In this way it is hoped that the frictional forces exerted on the rods A near the end caps G will be the same as on the rods near mid-length of the housing so that some of the rods will not be loose whilst others are clamped too tight. Unless the production facilities are very sophisticated, and therefore costly, to enable one to work to close tolerances, equal pressures on the rods are, however, practically impossible to achieve.

Another disadvantage is that, in use, the tips of adjacent stainless steel rods A very easily ride onto each other instead of remaining side by side in one plane, thereby increasing the danger of marking the profile quite apart from preventing an accurate reproduction of the counterpart of the contour to be obtained.

An important drawback in the manufacture of the known profile gauge is that it is enormously difficult, and therefore costly, to assemble. A multitude of rods A first has to be cleanly cropped to accurate lengths without leaving sharp edges or burrs and the correct number of rods has to be counted out and then laid side by side between the bearing surface D and friction member C without overlapping whilst being clamped in the housing B. A single rod too many or too few or out of place will render the gauge virtually inoperative. What is more, the rod material is frequently distorted before it is cut to length and therefore the rods may not be as straight as is required.

The invention has been based on the aforementioned considerations and aims to avoid the aforementioned disadvantages with a profile gauge of cheaper and yet sturdy construction.

According to the invention, a profile gauge comprises a multitude of longitudinally slotted juxtaposed elongate blades which are independently biased into frictional contact with, and longitudinally slidable with respect to, a common supporting member in the form of a plate engaged through all the slots of the blades, wherein the blades are of plastics material and the bias is provided by the resilience of the plastics material so that the blades are individually sprung onto the supporting member.

By means of the invention, therefore, a fundamental change is proposed to be made to the construction of the known profile gauge. There is no longer a housing and friction member clamped onto a multitude of rods. Instead, the now slotted blades are biased into frictional contact with the supporting plate, on which they can slide, the bias being provided by the resilience of the material of the blades, so that the latter can actually be sprung onto the supporting member.

To ensure that each blade is sprung onto the preferably rigid plate, its slot preferably contains a constriction at which the slot width is less than the plate thickness. This constriction may be formed by one or more pimples or pips projecting into the slot from one or each slot side. Alternatively, one or each side of the slot is tapered towards the mid-length of the slot. Preferably, the constriction is formed by flats at mid-length of each blade.

Ideally, the coefficient of friction between adjacent blades should be less, preferably considerably less, than that between the blades and the supporting plate. This is best achieved if the blades are moulded from acetal and the supporting member is made from aluminum alloy.

It has been found that, apart from curng some of the defects of known profile gauges, the profile gauges according to the invention also brings about some unexpected advantages. For example, it is now readily possible to make variously long profile gauges by simply providing a supporting plate, i.e. a cheap aluminum alloy plate, of the appropriate length, whereas hitherto differently long housing pressings (and the tools for making same) had to be provided. In any case, a practical limit was set to the length of the known profile gauge by the fact that equal pressures had to be exerted on the stainless steel rods by the housing and friction member and this cannot be achieved even on a hit and miss basis except when the gauge is short. Since each slotted blade in the construction of the invention is independently biased onto the supporting member, it does not really matter how long the supporting member might be and, therefore, how many elongate members are threaded on it.

Whereas the aforementioned known profile gauge cannot be laid flat on a workpiece with the tips of the rods touching the workpiece (because, as is evident from FIG. 1, the tips will always be raised from the workpiece by at least half the thickness of the housing from which the rods project), it is now possible to avoid a space between the tips of the blades and the work, as will become clearer from the following description of preferred examples with reference to the additional figures of the accompanying drawings, wherein:

FIG. 3 is a fragmentary side elevation of a profile gauge according to the invention held against a profile which is shown in cross-section;

FIG. 4 is an end elevation of the FIG. 3 gauge;

Figure 1:
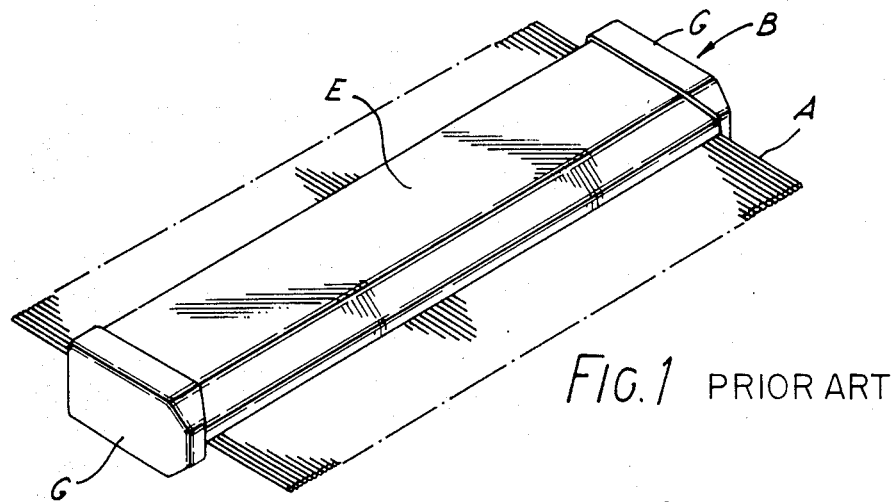
FIGS. 1 and 2 are respectively a top perspective view and a cross-section of the known gauge previously described.
Figure 2:
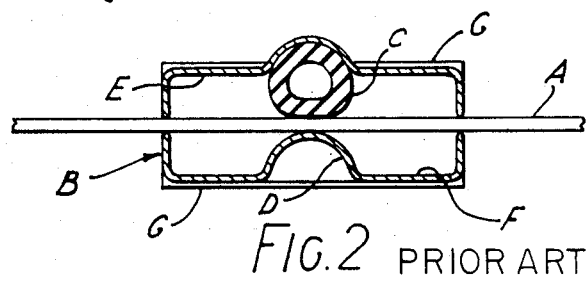
Figure 5:
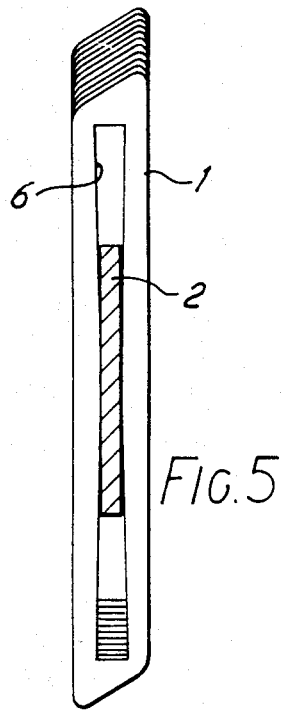
FIG. 5 is a section through the gauge taken on the line V—V in FIG. 3.

The profile gauge of FIGS. 3-5 comprises a multitude of juxtaposed equally long slotted elongate members 1 in the form of plastics blades which are independently biased into frictional contact with, and longitudinally slidable with respect to, a common supporting member 2 in the form of a rigid metal plate which engages through all the slots and carries end caps 3 for retaining the blades on the plate. In FIG. 3, the profile gauge is shown applied to a profile 4, a counterpart of the contour of this profile being defined by the lower ends of the blades and a replica of the contour being reproduced by the upper ends of the blades. The thinner the blades, the more accurately will te contour be reproduced. By way of example, blades having a length of about 106 mm and a thickness of about 1.5 mm will facilitate a reasonably accurate reproduction of contours as may be required by a do-it-yourself handyman and yet give the blades sufficient strength.

The bias of the blades 1 into frictional contact with the plate 2 is provided by the resilience of the plastics material of the blades which are sprung onto the plate. For this purpose, the slot 6 in each blade is at least partially narrower than the plate thickness, in the illustrated case by containing a central constriction formed by tapering sides bounding the slot, as shown especially in FIG. 5. During assembly of each blade on the plate, therefore, the material bounding the sides of the slot has to be flexed slightly apart, whereby this material is pre-stressed. Note that the ends of the slot 6 are markedly wider than the plate 2 is thick so that, if the blade is longitudinally displaced to its limit in either direction, the plate 2 will not become wedged in the end of the slot.

Figure 6:
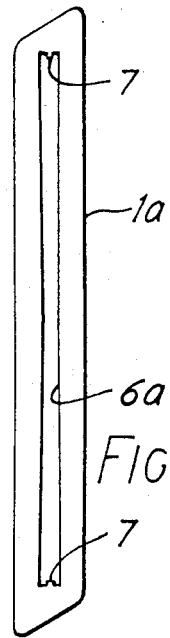
FIG. 6 is an end view on a modified blade of the gauge.

A similar biasing effect as in the blade construction of FIG. 5 could be obtained if constriction in a slot with straight sides is formed at least substantially mid-length of the slot by one or more pimples or pips projecting into the slot. In a further modification (see FIG. 6), the slot sides in blade 1a taper towards mid-length by only about 0° 10′ and jamming of the plate at the ends of the slots is prevented by pimples 7 at the ends.

Figure 7:
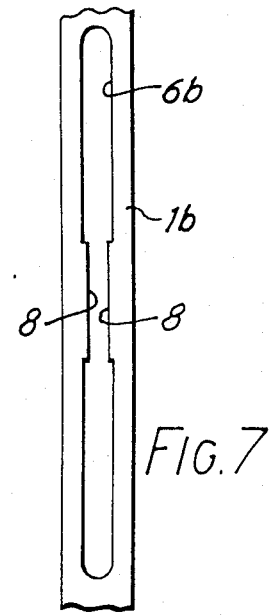
FIG. 7 is a fragmentary end view of another modified blade.

In the FIG. 7 embodiment, the constriction in slot 6b of blade 1b is defined by flats 8, which may be about 20 mm long for slots of 90 mm length co-operating with a blade of about 38 mm in width. The longer the constriction, the narrower can be the plate (or the longer the slot) and hence the longer the maximum relative movement between blade and plate.

For best results, the coefficient of surface friction between adjacent blades of the gauge should be less than the friction between each blade and the support plate 2. This is preferably achieved by moulding the blades from acetal and making the plate of aluminum alloy.

It will be seen that, contrary to the known constructions, the profile gauge according to the invention can be laid flat on a work surface with part of the contour-defining ends of the blades closely approaching the work. It is preferred to make the blades of substantially parallelogram shape as illustrated.

I claim:

1. A profile gauge comprising a multitude of juxtaposed elongate blades which are independently biased into frictional contact with, and longitudinally slidable with respect to, a common supporting member in the form of a plate, each of said blades containing a longitudinal slot and said supporting member being engaged through all the slots of said blades, wherein the said blades are of plastics material and the bias is provided by resilience of the said plastics material, the slot in each blade containing a constriction at which the slot width is less than the thickness of the plate such that at least part of the slot in each blade is narrower than the plate is thick, whereby said blades are individually sprung onto said supporting member, the constriction being defined by the sides bounding the slot converging toward mid-length.

2. A profile gauge according to claim 1, wherein said supporting member is a rigid metal plate.

3. A profile gauge according to claim 2, wherein said plate is of aluminum alloy.

4. A profile gauge according to claim 1, wherein said blades are of acetal.

5. A profile gauge comprising a multitude of juxtaposed elongate blades of plastics material which are independently biasd into direct frictional contact with, and longitudinally slidable with respect to, a common supporting member in the form of a metal plate, each of said plastics blades containing a longitudinal slot and said metal plate being engaged through all the slots of said blades, wherein the bias is provided by resilience of the said plastics material, the slot in each blade containing a constriction at which the slot width is less than the thickness of the plate such that at least part of the slot in each blade is narrower than the plate is thick, such that said blades are individually sprung onto said metal plate, the constriction being defined by the sides bounding the slot converging towards mid-length, said metal plate and said plastics blades being devoid of any material precluding direct biased frictional contact therebetween.

6. A profile gauge comprising a multitude of juxtaposed elongate blades which are independently biased into frictional contract with, and longitudinally slidable with respect to, a common supporting member in the form of a plate, each of said blades containing a longitudinal slot and said supporting member being engaged through all the slots of said blades, wherein the said blades are of plastics material and the bias is provided by resilience of the said plastics material, the slot in each blade containing a constriction at which the slot width is less than the thickness of the plate such that at least part of the slot in each blade is narrower than the plate is thick, whereby said blades are individually sprung onto said supporting member, said constriction being defined by confronting flats on the slot sides.

7. A profile gauge as claimed in claim 6 wherein said supporting member is a rigid metal plate.

8. A profile gauge as claimed in claim 6 wherein said blades are of acetal.

* * * * *